(12) United States Patent
Borbely et al.

(10) Patent No.: US 7,772,343 B2
(45) Date of Patent: Aug. 10, 2010

(54) POLYMERIC PRODUCT FOR FILM FORMATION

(76) Inventors: Janos Borbely, Kiserdo u. 4, Debrecen (HU) H-4225; Andrea Keczanne Uveges, Martonfalvi u. 5, Debrecen (HU) H-4032; Mihaly Szatmatri, Tarccsay u. 5, Berettyoujfalu (HU) H-4100

( * ) Notice: Subject to any disclaimer, the term of this patent is extended or adjusted under 35 U.S.C. 154(b) by 0 days.

(21) Appl. No.: 11/900,191

(22) Filed: Sep. 10, 2007

(65) Prior Publication Data

US 2008/0004402 A1    Jan. 3, 2008

(51) Int. Cl.
*C08F 2/00*     (2006.01)
*C08F 257/02*   (2006.01)
*C08F 265/04*   (2006.01)

(52) U.S. Cl. .................. 526/319; 526/72; 526/320; 526/329.5; 526/329.6; 525/222; 525/227; 525/242

(58) Field of Classification Search ................ 525/242, 525/298, 302, 304, 305, 326.1, 64, 69, 222, 525/227, 228, 902; 526/72, 319, 320, 329.5, 526/329.6; 523/201, 206
See application file for complete search history.

(56) References Cited

U.S. PATENT DOCUMENTS 6,846,564 B1 * 1/2005 Pascault et al. ............. 428/402
2002/0013410 A1 * 1/2002 Mizuta et al. ................. 525/63

FOREIGN PATENT DOCUMENTS

WO    WO-0059952 A1 * 10/2000

OTHER PUBLICATIONS ihara, E et al. "Living Polymerizations and Copolymerizations of Alkyl Acrylates by the Unique Catalysis of Rare Earth Metal Complexes" Macromolecules vol. 28 (1995) pp. 7886-7892.*
Brandup, J. et al Polymer Handbook 4th Edition John Wiley & Sons, Inc. New York et al, 1999 p. II/415.*

* cited by examiner

Primary Examiner—Irina S Zemel
Assistant Examiner—Jeffrey Lenihan
(74) Attorney, Agent, or Firm—Thomas A. O'Rourke; Bodner & O'Rourke LLP

(57) ABSTRACT

The present invention relates to core/shell vinyl polymers wherein an at least partially crosslinked core is formed from a monovinyl monomer and/or a di/tri/ or higher multivinyl monomer wherein the degree of crosslinking in the core ranges from slight to high depending on the ratio of monovinyl and/or di/tri/ or higher multivinyl monomers, and wherein the outer shell is formed from a monovinyl and/or a di/tri/ or higher multi-vinyl monomer that optionally may be crosslinked, and wherein the outer shell has on its surface linear or branched $C_3$-$C_{30}$ alkyl chains formed from substituted vinyl monomers.

23 Claims, No Drawings

US 7,772,343 B2

POLYMERIC PRODUCT FOR FILM FORMATION

The present application claims priority of U.S. Provisional Application Ser. No. 60/375,630 filed Apr. 26, 2002 as a Small Entity (which status applies to present application).

FIELD OF THE INVENTION

The present invention relates to core/shell vinyl polymers wherein an at least partially crosslinked core is formed from a monovinyl monomer and/or a di/tri/ or higher multivinyl monomer wherein the degree of crosslinking in the core ranges from slight to high depending on the ratio of monovinyl and/or di/tri/ or higher multivinyl monomers, and wherein the outer shell is formed from a monovinyl and/or a di/tri/ or higher multi-vinyl monomer that optionally may be crosslinked, and wherein the outer shell has on its surface linear or branched $C_3$-$C_{30}$ alkyl chains formed from substituted vinyl monomers.

BACKGROUND OF THE INVENTION

In recent years, environmental problems such as destruction of the ozone layer, global warming, environmental pollution, and air pollution are being increasingly addressed. At the same time, for environmental protection, the governments of many countries have imposed various controls, for instance, in the US the National VOC [Volatile Organic Compound] Emission Standard (Section 183 e), in the EU countries Council Directive (1999/13/EC) and in some accession countries, e.g. Hungary (10/2001 Governmental Decree), have been promulgated to regulate activities in areas of concern. In such circumstances, releasing organic solvents in the air has become a significant problem and, consequently an attempt to use less or no solvents has become increasingly common in many industries. Also in the coating industry, powder coatings are being tested as substitutes for conventional solvent-type coatings. Improvements in the coat film performance of high-solid, or advanced high-solid coatings are being developed to meet requirements of environmental protection and good technical applicability. The development of new polymers with designed structure and architecture has, consequently, become an intensively studied field of material science.

It is known in the art to use core/shell, star and microgel polymers to combine mechanical and thermal properties of polymeric particles. The core is formed by cross-linking mono- and/or di- or higher multifunctional vinyl monomers. Then in a second stage the outer shell is formed from monovinyl and di- and/or multi-vinyl monomers that optionally may be crosslinked. Macromolecules typically exist in a solution phase as a sol macromolecular colloid system. These systems are usually prepared in an aqueous medium as an emulsion polymerization. The polymerization of the monomers with multiple vinyl functionality results in gelation of the whole mixture.

The following patents further describe the technological background of the present invention:

Fujii et al. in U.S. Pat. No. 5,298,559 describe a multi-layered polymer system polymer having core layer of an aromatic vinyl polymer, an intermediate layer of a butadienic rubbery polymer and an outer layer of an aromatic vinyl glassy polymer, that provides a thermoplastic resin composition excellent not only in impact strength, especially in impact strength at low temperatures.

Oshima et al. in U.S. Pat. No. 5,324,780 prepare core-shell polymers comprising a core phase which is a rubbery polymer and a shell phase which is a glassy polymer with an unsaturated dicarboxylic acid or its mono-alkyl ester as a constituent thereof, wherein the toluene-soluble fraction of the core-shell polymer accounts for not more than 10% by weight. The resin compositions and molded articles which comprise the core-shell polymer as an impact modifier have good features, especially a high impact strength at temperatures ranging from room temperature to $-30.degree.$ C.

Eisenhart et al. in U.S. Pat. No. 5,451,641 describe a polymeric thickener which consists of multi-stage polymer particles comprising at least one hydrophobically-modified, ionically-soluble polymer stage polymerized from hydrophobic monomer and ethylenically-unsaturated monomers. The grafting monomer may be, among others, an unsaturated carboxylic acid allyl ester, such as allyl acrylate, allyl methacrylate, diallyl maleate, diallyl fumarate, diallyl itaconate, etc. In particular, allyl methacrylate is preferred. Such crosslinking monomer and grafting monomer are used each in an amount within the range of 0.01 to 5% by weight, preferably 0.1 to 2% by weight, based on the total monomer amount for the core.

Takeuchi et al. in U.S. Pat. No. 5,453,458 describe a two and multistage polymerization forming a core-shell polymer which core is composed essentially of a cross-linked polymer of styrene. The core-shell polymer of the invention can be produced by a multi-stage seed emulsion polymerization method or a multi-stage suspension polymerization method. In the first-stage polymerization, they use a cross-linking monomer as a monomer in an amount of not more than 5% by weight, preferably in an amount of not more than 2% by weight, based on the total of the core forming monomers used in the first-stage polymerization. The polymerization described here gives only a lightly crosslinked core with a limited impact properties.

Chandran et al. in U.S. Pat. No. 6,165,563 describe star-branched polymers containing pendent olefinic groups which have been crosslinked using actinic radiation, and the use of these polymers in adhesives and coating applications.

Letchford et al. in U.S. Pat. No. 6,221,991 disclose an anionic polymerization to provide novel polar polymers, including functionalized, telechelic, heterotelechelic, and multi-branched or star methacrylate and acrylate polymers, and processes for preparing the same. The novel polymers have applications in a variety of areas, including use in low VOC coatings, adhesives, and as viscosity index (V.I.) improvers for lubricants. The invention also provides processes for anionic polymerization of polar monomers to produce the polymers of the invention. These polymers are prepared from protected functionalized initiators which are reacted with an appropriate diaryl alkenyl group, such as 1,1-diphenylethylene, to provide a stabilized carbanion. A polar monomer, preferably methyl methacrylate, is polymerized in the presence of the initiator to provide a living anion.

Blankenship et al. in U.S. Pat. No. 6,252,004 disclose a process for preparing emulsion polymer particles providing an aqueous emulsion of a multistage core-shell polymer with a hydrophilic core. The process produces multistage polymers having low dry-bulk density useful in coating compositions such as paints and paper coatings.

Solomon et al. in U.S. Pat. No. 6,300,443 describe a process for preparing polymeric microgels comprising reacting an alkoxyamine with an unsaturated monomer composition comprising a cross-linking agent comprising at least two double bonds and optionally one or more further monomers selected from monounsaturated monomers and conjugated diene monomers.

Lubnin et al. in U.S. Pat. No. 6,316,107 disclose an emulsion or suspension polymer comprising a vinyl chloride polymeric core and an acrylic ester-acrylonitrile polymeric shell. The emulsion polymer was preferably prepared using a two-stage process. In the first stage, a vinyl chloride monomer was polymerized or copolymerized to form a first phase of a polymeric hard core having a relatively high chlorine content. In a second stage, the soft acrylic ester-acrylonitrile copolymer was made in situ in a reaction mixture comprising the first phase. The product provides both flame retardancy and low minimum film-forming temperature (MFFT), and is useful in a variety of coating and binding applications.

OBJECTS OF THE INVENTION

It is an object of the present invention to provide novel core/shell compositions that are useful in forming surface coatings.

Another object is to provide novel core/shell compositions for use in surface coatings having improved film forming properties.

A further object is to provide novel core-shell compositions that form surface coatings having improved adhesion, hardness, and flexibility.

Still another object is to provide novel core/shell compositions that have increased cross-linking, but which do not form gels.

Yet another object is to provide novel core/shell compositions wherein the shell has attached to its surface a linear or branched alkyl chain having a terminal group adapted to react with predetermined groups, or to provide better film formation and adhesion properties.

Another object is to provide methods for preparing these compositions.

These and other objects of the present invention will be apparent from the following description.

SUMMARY OF THE INVENTION

The present invention relates to composite particle dispersions and, more particularly, it relates to core/shell polymers. The crosslinked polymeric core is formed from a linear vinyl polymer that has been at least partially crosslinked with a mono/di/tri/and/or higher multifunctional monomer copolymerizable therewith. The polymeric outer shell is formed from mono/di/tri/ and/or higher multi-vinyl monomer that can be linear, branched, or crosslinked, or a mixture of two or more of the foregoing. The outer shell has on its surface a plurality of linear or branched alkyl chains formed from a vinyl monomer or a mixture thereof containing a terminal group adapted to react with at least one predetermined chemical group, or to provide better film formation and adhesion properties. The core, the outer shell, and the surface linear chains can be formed independently to be hydrophobic or hydrophilic. The polymerization can take place in a single stage process or in a multi-step process. In the single stage process, the core first is formed as a crosslinked seed wherein, due to sterical hindrance, adjacent linear or branched chains are formed. When the polymerization is performed in two or more stages, the formation of the primary crosslinked core is followed by formation of a covalently attached shell. Such polymers demonstrate increased cross-linking, improved film forming properties, and improved solubility in organic solvents.

DETAILED DESCRIPTION OF THE INVENTION

The polymeric compositions of the present invention can be prepared by polymerizing vinyl monomers by free radical polymerization. The vinyl monomers are acrylic and methacrylic derivatives, preferably ester derivatives, and aromatic vinyl derivatives with one or more vinyl groups. Free radical polymerization is initiated by substituted peroxides or preferably by azo compounds. The core of the core/shell vinyl polymers of the present invention is formed from a linear vinyl polymer that is at least partially crosslinked, preferably with a mono/di/tri/ and/or higher multifunctional monomer copolymerizable therewith, which may be saturated or unsaturated, hydrophobic or hydrophilic, and a polymeric outer shell that is formed from a mono/di/tri and/or multi-vinyl monomer that optionally can be linear, branched, or crosslinked, or a mixture of two or more of the foregoing, and wherein the outer shell has on its surface a plurality of linear or branched $C_3$-$C_{30}$ alkyl chains optionally having a terminal group adapted to react with at least one predetermined chemical group, or adapted to provide better film formation and adhesion properties. Alkyl groups lacking reactive groups act to modify physical properties (e.g., glass transition temperature (Tg), solubility, etc.) of the polymer. Alkyl groups having a terminal group adapted to react with at least one predetermined chemical group serve to form crosslinked coatings which have excellent physical and chemical resistance.

A detailed listing of Examples of specific monovinyl monomers are disclosed below under the heading "Polymerizable Vinyl Compounds: A. Monovinyl Monomers." The following compounds are illustrative of this group: 2-hydroxyethylacrylate, 2-hydroxyethyl(meth)acrylate, 3-hydroxypropylacrylate, 3-hydroxypropyl(meth)acrylate, glycidylacrylate, glycidyl(meth)acrylate, caprolactone 2-(methacryloyloxy)ethyl ether, ethyl(meth)acrylate, propyl (meth)acrylate, and 2-ethylhexyl(meth)acrylate-.

The degree of crosslinking in the core can vary from as little as about 1% to about 99%, depending upon the pendent double bonds in the di-, tri, and/or higher multifunctional monomers. The polymerization reaction is controlled by the conditions of reaction (e.g., concentration, temperature, solvent, etc.) to obtain either a very slightly crosslinked core wherein the porosity is very high, or to obtain a very highly crosslinked core wherein the porosity is very low. The degree of crosslinking is in the range of from about 5% to about 95%, preferably from about 20% to about 70%, and more preferably from about 30% to about 50%. When the core contains unreacted double bonds, that is, when it is slightly or not highly crosslinked, a post polymerization reaction is used to convert it to a very highly crosslinked core having the degrees of crosslinking indicated above. Linear chains may be attached to the surface of the shell optionally containing reactive groups, preferably, hydroxy or epoxy, or containing less reactive groups, e.g. aliphatic groups, for better film formation and adhesion properties.

The composition of the shell depends on the type and number of monomers as described below. If the core contains unreacted double bonds, that is, when the core is slightly or even highly cross-linked, the shell is attached to the core by covalent bonds. If the core is largely saturated, the shell is physically attached to the shell by secondary bonds, or aggregation due to particle-particle interaction between the core and molecules in the shell. If the shell is composed of di/tri/ and/or higher multi-vinyl monomers it has a crosslinked structure. According to the core/shell polymers of the present invention, the core comprises from about 5 weight % to about 95 weight % of the total weight of the polymer, the shell comprises from about 1% to about 99% of the total weight of the polymer, and the alkyl chains comprise from about 1% to about 10% of the total weight of the polymer.

The porosity of the core and of the shell depends on the ratio of mono- and di- and multivinyl monomers. Both the core, the shell, and the linear chains on the surface of the shell, can be formed independently from hydrophobic or hydrophilic chains. As a result, the nature of the core-shell compositions of the present invention can be varied in many ways as illustrated by the following table.

TABLE I

Examples of Various Combinations of Hydrophilic and Hydrophobic Components

| EX. | CORE | SHELL | LINEAR CHAINS |
| --- | --- | --- | --- |
| A. | Hydrophilic | Hydrophilic | Hydrophilic |
| B. | Hydrophilic | Hydrophilic | Hydrophobic |
| C. | Hydrophilic | Hydrophobic | Hydrophobic |
| D. | Hydrophilic | Hydrophobic | Hydrophilic |
| E. | Hydrophilic | Hydrophobic | Hydrophobic |
| F. | Hydrophobic | Hydrophobic | Hydrophilic |
| G. | Hydrophobic | Hydrophilic | Hydrophobic |
| H. | Hydrophobic | Hydrophobic | Hydrophobic |

The core/shell particles of the present invention, which are useful for application to different substrates, e.g. ceramics, glass, leather, metal, paper and paper products, plastics, stone, textiles, wood, etc., have the following characteristics:

| | |
| --- | --- |
| Morphology: | Spherical macromolecular particles |
| Particle size: | 35-150 nm |
| Functionality: | Hydrophilic (OH, COOH, amine, epoxy, etc.) |
| | Hydrophobic (alkyl, aromatic, etc.) |
| Porosity: | Variable |

The morphology of a representative hydrophobic core and of a core/shell nanoparticle with attached alkyl chains (hydrophilic structures and mixed hydrophobic/hydrophilic components are obvious variants) is shown below:

Morphology of Core and Core/Shell Nanoparticles Structure: for Hydrophobic Components
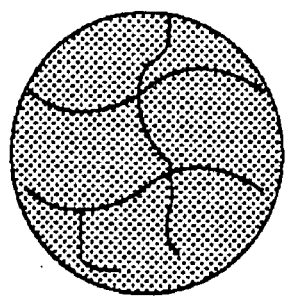
Hydrophobic core
organic solvent soluble
or dispersable
VOC lowering, powder
coatings
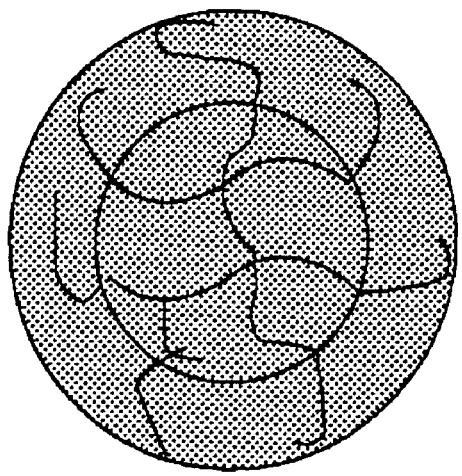
Hydrophobic core
and
hydrophobic shell
organic solvent soluble
or dispersable
VOC lowering, powder
coatings The polymeric macromolecular structures preferably are synthesized by a novel three-step process that produces spherical nanometer-sized core-shell particles wherein the polymeric core is produced from suitable mono/di/tri and/or higher multifunctional vinyl monomers, wherein the polymeric core is copolymerized with the other shell monomers to produce desired modifications of properties, and is at least partially surrounded by the shell which comprises covalently or physically bonded chains. The first step is the formation of the core with at least some crosslinked chains; the second step is post-polymerization to increase the density of crosslinking in the core; and the third step is to link the shell to the core.

The shell polymer is formed by applying a coating of a vinyl monomer to the surface of the core polymer. This surface coating is then polymerized using, in general, the same conditions as used to form the core polymer. The structure and composition of the shell polymer attached to the core can differ from the structure and composition of the core portion of the macromolecule Polymerization, according to techniques used heretofore, using a di- or higher multifunctional reactants, provides a crosslinked polymeric material in a sol macromolecular colloid state. The crosslinking reactions form primary or secondary cycles in the polymeric chain. The growth of the polymeric chain is instantaneous up to formation of clusters or formation of a macroscopic gel. The reaction conditions applied according to the present invention result in the formation of macromolecules in a range of 1,000 to 30,000,000 Daltons wherein gel formation of the polymer is avoided and the solution shows rheological properties associated with Newtonian liquids.

Examples of Some Suitable Polymerizable Vinyl Compounds

A. Monovinyl Monomers

Specific examples of suitable core co-monomers that are useful to form a linear vinyl monomer include the following: (meth)acrylate esters such as methyl (meth)acrylate, ethyl (meth)acrylate, n-propyl(meth)acrylate, n-butyl(meth)acrylate, isopropyl(meth)acrylate, isobutyl(meth)acrylate, n-amyl(meth)acrylate, n-hexyl (meth)acrylate, isoamyl (meth)acrylate, 2-hydroxyethyl(meth)acrylate, 2-hydroxypropyl (meth)acrylate, N,N-dimethylaminoethyl(meth)acrylate, N,N-diethylaminoethyl(meth)acrylate, t-butylaminoethyl(meth)acrylate, 2-sulfoethyl(meth)acrylate, trifluoroethyl(meth)acrylate, glycidyl(meth)acrylate, benzyl(meth)acrylate, allyl(meth)acrylate, 2-n-butoxyethyl (meth)acrylate, 2-chloroethyl(meth)acrylate, sec-butyl-(meth)acrylate, tert-butyl(meth)acrylate, 2-ethylbutyl(meth)acrylate, cinnamyl(meth)acrylate, crotyl(meth)acrylate, cyclohexyl(meth)acrylate, cyclopentyl(meth)acrylate, 2-ethoxyethyl(meth)acrylate, furfuryl(meth)acrylate, hexafluoroisopropyl(meth)acrylate, methallyl(meth)acrylate, 3-methoxybutyl(meth)acrylate, 2-methoxybutyl(meth)acrylate, 2-nitro-2-methylpropyl (meth)acrylate, n-octyl (meth)acrylate, 2-ethylhexyl(meth)acrylate, lauryl (meth)acrylate, 2-phenoxyethyl(meth)acrylate, 2-phenylethyl (meth)acrylate, phenyl(meth)acrylate, propargyl(meth)acrylate, tetrahydrofurfuryl(meth)acrylate, norbornyl(meth)acrylate, tetrahydropyranyl(meth)acrylate, vinyl acetate, (meth)acrylonitrile, vinylpropionate, vinylidene chloride, (meth)acrylamide, N-methylolacrylamide, acrylic and methacrylic acids, ethyl acrylate, ethyl methacrylate, benzyl acrylate, benzyl methacrylate, propyl acrylate, propyl methacrylate, iso-propyl acrylate, iso-propyl methacrylate, butyl acrylate, butyl methacrylate, hexyl acrylate, hexyl methacrylate, octadecyl methacrylate, octadecyl acrylate, lauryl methacrylate, lauryl acrylate, hydroxyethyl acrylate, hydroxyethylmethacrylate, hydroxyhexyl acrylate, hydroxyhexyl methacrylate, hydroxyoctadecyl acrylate, hydroxyoctadecyl methacrylate, hydroxylauryl methacrylate, hydroxylauryl acrylate, phenethyl acrylate, phenethyl methacrylate, 6-phenylhexyl acrylate, 6-phenylhexylmethacrylate-, phenyllauryl acrylate, phenyllauryl methacrylate, 3-nitrophenyl-6-hexyl methacrylate, 3-nitrophenyl-18-octadecyl acrylate, ethyleneglycol dicycopentyl ether acrylate, vinyl ethyl ketone, vinyl propyl ketone, vinyl hexyl ketone, vinyl octyl ketone, vinyl butylketone, cyclohexyl acrylate, 3-methacryloxypropyldimethylmethoxysilane, 3-methacryloxypropylmethyldimethoxysilane, 3-methacryloxypropylpentamethylldisiloxane, 3-methacryloxypropyltris(trimethylsiloxy)silane, 3-acryloxypropyldimethylmethoxysilane, acryloxypropylmethyldimethoxysilane, trifluoromethyl styrene, trifluoromethyl acrylate, trifluoromethyl methacrylate, tetrafluoropropyl acrylate, tetrafluoropropyl methacrylate, heptafluorobutyl methacrylate, N,N-dihexyl acrylamide, N,N-dioctyl acrylamide, aminoethylacrylate, aminoethyl methacrylate, aminoethyl butacrylate, aminoethylphenyl acrylate, aminopropyl acrylate, aminopropyl methacrylate, aminoisopropyl acrylate, aminoisopropylmethacrylate, aminobutyl acrylate, aminobutyl methacrylate, aminohexyl acrylate, aminohexyl methacrylate, aminooctadecyl methacrylate, aminooctadecyl acrylate, aminolaurylmethacrylate, aminolauryl acrylate, N,N-dimethyl-aminoethyl acrylate, N,N-dimethylaminoethyl methacrylate, N,N-diethylaminoethyl acrylate, N,N-diethylaminoethyl methacrylate, piperidino-N-ethyl acrylate, vinyl propionate, vinylacetate, vinyl butyrate, vinyl butyl ether, and vinyl propyl ether, styrene and alkyl derivatives B. Examples of Some Suitable Di- and Multivinyl Monomers Crosslinking monomers suitable for use as the cross-linker in the core polymer are known to those skilled in the art, and are generally di- and higher multifunctional monomers copolymerizable with the other core monomers, as for example, glycol dimethacrylates and acrylates, triol triacrylates and methacrylates and the like. The preferred crosslinking monomers are butylene glycol diacrylates. When a crosslinking monomer is employed, it is preferably used at levels of from about 0.05% to about 50%, more preferably 0.5 to about 20%, and most preferably from about 5% to about 15%, based on the total weight of the core monomer before cross-linking.

Some specific examples of crosslinking monomers are: N,N'-methylene-bis-acrylamide, ethylene glycol diacrylate, diethylene glycol diacrylate, triethylene glycol diacrylate, tetraethylene glycol diacrylate, polyethylene glycol diacrylate, propylene glycol diacrylate, polypropylene glycol diacrylate, butanediol diacrylate, hexanediol diacrylate, pentaerythritol triacrylate, trimethylolpropane triacrylate, tripropylene glycol diacrylate, neopentyl glycol diacrylate, ethylene glycol dimethacrylate, diethylene glycol dimethacrylate, dipropylene glycol diacrylate, triethylene glycol dimethacrylate, polyethylene glycol dimethacrylate, polypropylene glycol dimethacrylate, butanediol dimethacrylate, hexanediol dimethacrylate, trimethylolethane trimethacrylate, trimethylolpropane trimethacrylate. divinyl benzene, allyl methacrylate (ALMA), ethylene glycol dimethacrylate (EGDMA), trimethylolpropane trimethacrylate (TMPTMA), divinyl benzene (DVB), glycidyl methacrylate, 2,2-dimethylpropane 1,3 diacrylate, 1,3-butylene glycol diacrylate, 1,3-butylene glycol dimethacrylate, 1,4-butanediol diacrylate, diethylene glycol diacrylate, diethylene glycol dimethacrylate, 1,6-hexanediol diacrylate, 1,6-hexanediol dimethacrylate, tripropylene glycol diacrylate, triethylene glycol dimethacrylate, tetraethylene glycol diacrylate, polyethylene glycol 200 diacrylate, tetraethylene glycol dimethacrylate, polyethylene glycol dimethacrylate, ethoxylated bisphenol A diacrylate, ethoxylated bisphenol A dimethacrylate, polyethylene glycol 600 dimethacrylate, poly(butanediol) diacrylate, trimethylolpropane triacrylate, trimethylolpropane trimethacrylate, pentaerythritol triacrylate, trimethylolpropane triethoxy triacrylate, glyceryl propoxy triacrylate, pentaerythritol tetraacrylate, pentaerythritol tetramethacrylate, and dipentaerythritol monohydroxypentaacrylate.

As further crosslinking monomers there may be mentioned, for example, aromatic divinyl monomers, such as divinylbenzene, bisphenol A di(meth)acrylate, bisphenol A diglycidyl ether di(meth)acrylate, and alkane polyol acrylates and alkane polyol methacrylates, such as ethylene glycol diacrylate, ethylene glycol dimethacrylate, butylene glycol diacrylate, butylene glycol dimethacrylate, hexanediol diacrylate, hexanediol dimethacrylate, oligoethylene glycol diacrylate, oligoethylene glycol dimethacrylate, trimethylolpropane diacrylate, trimethylolpropane dimethacrylate, trimethylolpropane triacrylate, trimethylolpropane trimethacrylate. Particularly preferred are butylene glycol diacrylate, hexanediol diacrylate and dipropylene glycol di(meth)acrylate.

The highly crosslinked core of the core/shell polymers of the present invention imparts good physical properties such as hardness, adhesion and viscosity lowering properties. The linear chains attached to the shell allow connecting monomers holding functional groups that facilitate adhesion to a metal surface, and/or crosslinking with one or more other functional groups such as, for example, amines, carboxylic acids, epoxy compounds and isocyanates. The core/shell polymers of the present invention have enhanced solubility in esters, ketones and aromatic solvents.

The following Examples illustrate the present invention without, however, limiting the same thereto. Testing of the physical properties of several durable, film-forming, polymers was performed and compared to prior art polymers. The tests involved a film-forming test, and a measurement of the glass transition temperature, Tg. Composition was determined by NMR spectroscopy. Molecular weight was determined by SEC method. Hydrodynamic volume of macromolecules was calculated on the basis of Laser light scattering measurements. Viscosity was measured by rotational viscometer.

(1) Film Forming Test. The core/shell polymer of the present invention was cast on a glass or aluminum substrate and allowed to dry at ambient conditions for several hours.

(2) Measurement of Tg. The glass transition temperature was measured by Differential Scanning Calorimetry, using a DSC available from Mettler-Toledo.

EXAMPLE 1

Preparation of Saturated, Hydrophobic Core Co-Polymer

The hydrophobic core was formed as follows: A 1-liter, four necked, round bottom flask was equipped with paddle stirrer, thermometer, nitrogen inlet, and reflux condenser. Toluene, 443 grams, was added to the kettle and heated to 60.degree. C. under a nitrogen atmosphere. A monomer mixture was prepared by mixing 10.00 grams of butylacrylate, 25.00 g styrene, and 20.00 g dipropyleneglycoldiacrylate. As initiator, 3.3 g of azo bis isobutyronitrile (AIBN), was added. After 12 hours the mixture was cooled to 20.degree. C. and hexane was added to precipitate the polymer in a yield of 96%. The polymer was characterized by NMR spectroscopy, Size Exclusion Chromatography (Mw=5.times.10.sup.3-5.times.-10.sup.6), Differential Scanning Calorimetry (DSC) (Tg=54.degree. C.). Polymer (70%) was dissolved in butyl acetate (30%). A 30 micron thin film was coated on the surface of aluminum plate by film applicator, tests of crosscut method give a 5B result according the ASTM. D 3359-97 Standard Test Methods for Measuring Adhesion by Tape Test. The hardness of the film was 300 (after 1 day) and 320 (after 7 days) by ASTM D-4366-95 Standard Test Methods for Hardness of Organic Coatings by Pendulum Damping Test.

EXAMPLE 2

Preparation of Unsaturated, Hydrophobic Core Co-Polymer

A core was prepared as follows: A 1-liter, four necked, round bottom flask was equipped with paddle stirrer, thermometer, nitrogen inlet, and reflux condenser. Toluene, 443 grams, was added to the kettle and heated to 60.degree. C. under a nitrogen atmosphere. A monomer mixture was prepared by mixing 7.20 grams of styrene, 13.80 g and ethyleneglycol di(meth)acrylate. As initiator, 1.3 g of azo bis isobutyronitrile (AIBN), was added. After 12 hours the mixture was cooled to 20.degree. C. and methanol was added to precipitate the hydrophobic polymer. Yield: 96%. The polymer was characterized by NMR spectroscopy to determine the unrelated pendant double vinyl bonds, Size Exclusion Chromatography (Mw=5.times.10.sup.3-5.times.10.sup.6), Differential Scanning Calorimetric (DSC) indicated an exothermic polymerization reaction with a broad peak in the range of 135-210.degree. C., and Tg=125.degree. C.

EXAMPLE 3

Preparation of Unsaturated, Hydrophobic Core Co-Polymer

A core was prepared as follows: A 1-liter, four necked, round bottom flask was equipped with paddle stirrer, thermometer, nitrogen inlet, and reflux condenser. Toluene, 443 grams, was added to the kettle and heated to 60.degree. C. under a nitrogen atmosphere. A monomer mixture was prepared by mixing 7.20 grams of butylacrylate and 13.80 g of ethyleneglycol di(meth)acrylate. As initiator, 1.3 g of azo bis isobutyronitrile (AIBN), was added. After 12 hours the mixture was cooled to 20.degree. C. and hexane was added to precipitate the hydrophobic polymer. Yield: 96%. The polymer was characterized by NMR spectroscopy to determine the unreacted pendant double vinyl bonds, Size Exclusion Chromatography (SEC) (Mw=5.times.10.sup.3-5.times.10.sup.6), Differential Scanning Calorimetry (DSC) indicated an exothermic polymerization reaction with a broad peak in the range of 105-210.degree. C., and Tg=25.degree. C.

EXAMPLE 4

Preparation of Unsaturated, Hydrophobic Core Co-Polymer

A core was prepared as follows: A 1-liter, four necked, round bottom flask was equipped with paddle stirrer, thermometer, nitrogen inlet, and reflux condenser. Toluene, 443 grams, was added to the kettle and heated to 60.degree. C. under a nitrogen atmosphere. A monomer mixture was prepared by mixing 7.20 grams of styrene, 13.80 g and trimethylolpropane tri(meth)acrylate. As initiator, 1.3 g of azo bis isobutyronitrile (AIBN), was added. After 12 hours the mixture was cooled to 20.degree. C. and methanol was added to precipitate the hydrophobic core polymer. Yield: 96%. The polymer was characterized by NMR spectroscopy to determine the unreacted pendent double vinyl bonds, Size Exclusion Chromatography (Mw=5.times.10.sup.3-5.times.10.sup.6), Differential Scanning Calorimetry (DSC indicated with a broad peak in the range of 135-210.degree. C., and Tg=146 C.

EXAMPLE 5

Preparation of Saturated, Hydrophobic Core Polymer

Following the procedure of Example 4, styrene and propane diol diacrylate were polymerized in toluene at 60.degree. C. initiated with AIBN. Yield: 96%. A saturated polymer sample was obtained.

EXAMPLE 6

Post-Polymerization of Unsaturated Core Polymer

The unsaturated polymer prepared in Example 2 was post-polymerized. A 1-liter, four necked, round bottom flask was equipped with paddle stirrer, thermometer, nitrogen inlet, and reflux condenser. Toluene, 443 grams, was added to the kettle and heated to 60.degree. C. under a nitrogen atmosphere, and 20 g of polymer prepared according to Example 2 was dissolved therein. As initiator, 1.3 g of azo bis isobutyronitrile (AIBN), was added. After 12 hours the mixture was cooled to 20.degree. C. and methanol was added to precipitate the hydrophobic polymer. Yield: 98%. The polymer was characterized by NMR spectroscopy and unreacted pendent double vinyl bonds were not observed, Size 44 Exclusion Chromatography (Starting Mw=1.26.times.10.sup.4, final Mw=1.28.times.10.sup.4), Differential Scanning Calorimetry (DSC) indicated an exothermic polymerization reaction but a broad peak was not observed, and Tg=126.degree. C.

EXAMPLE 7

Post-Polymerization of Unsaturated Core Polymers

The hydrophobic core polymer prepared in Example 3 was post-polymerized under the same conditions as described in Example 6. A 1-liter, four necked, round bottom flask was equipped with paddle stirrer, thermometer, nitrogen inlet, and reflux condenser. Toluene, 443 grams, was added to the kettle and heated to 60.degree. C. under a nitrogen atmosphere, and 20 g of polymer prepared as Example 3 was dissolved therein. As initiator, 1.3 g of azo bis isobutyronitrile (AIBN), was added. After 12 hours the mixture was cooled to 20.degree. and hexane was added to precipitate the polymer. Yield: 97%. The polymer was characterized by NMR spectroscopy and unreacted pendent double vinyl bonds were not observed, Size Exclusion Chromatography (Starting Mw=2.65.times.10.sup.4 final Mw=2.78.times.10.sup.4), Differential Scanning Calorimetry (DSC) indicated an exothermic polymerization reaction but a broad peak was not observed, and Tg=36.degree. C.

EXAMPLE 8

Post-Polymerization of Unsaturated Core Polymers

The hydrophobic core polymer prepared in Example 4 was post-polymerized under the same conditions as described in Example 6. A 1-liter, four necked, round bottom flask was equipped with paddle stirrer, thermometer, nitrogen inlet, and reflux condenser. Toluene, 443 grams, was added to the kettle and heated to 60.degree. C. under a nitrogen atmosphere, and 20 g of polymer prepared following the procedure of example 4 was dissolved therein. As initiator, 1.3 g of azo bis isobutyronitrile (AIBN), was added. After 12 hours the mixture was cooled to 20.degree. C. and methanol was added to precipitate the polymer. Yield: 98%. The polymer was characterized by NMR spectroscopy and unreacted pendant double vinyl bonds were not observed, Size Exclusion Chromatography (Starting Mw=-2.2.times.10.sup.5 final Mw=2.8.times.10.sup.5), Differential-Scanning Calorimetry (DSC) indicated an exothermic polymerization reaction but a broad peak was not observed, and Tg=136.degree. C.

EXAMPLE 9

Preparation of Core/Shell Polymers with Hydroxyl Functional Groups

All core polymers in Exp. 1-5 and the postpolymerized derivatives are hydrophobic. Here the added monomer is hydrophilic. The surfaces of the following core/shell polymers contain hydrophilic hydroxy groups.

Each of the core polymers prepared in Examples 1-5, and the core polymers treated in the post-polymerization reactions of Examples 6-8 were mixed with hydroxyethyl(meth) acrylate which had been kept at room temperature for one hour to stick on the macromolecular colloid particles. Using the same conditions as described in Examples 1-8, the core polymers were further polymerized to form the shell having at its surface hydroxyl groups. Thus, a 1-liter, four necked, round bottom flask was equipped with paddle stirrer, thermometer, nitrogen inlet, and reflux condenser. Toluene, 443 grams, was added to the kettle and heated to 60.degree. C. under a nitrogen atmosphere. A monomer and polymer mixture was prepared by mixing 100.00 grams of polymer obtained in Example 1 and 10.00 g hydroxyethyl(meth)acrylate to form the shell polymer having linear chains on its surface. As initiator, 1.3 g of azo bis isobutyronitrile (AIBN), was added. After 12 hours the mixture was cooled to 20.degree. C. and hexane was added to precipitate the polymer. Yield: 96%. This hydrophobic core/hydrophilic shell polymer has hydroxyl groups at its surface for subsequent reaction with isocyanate groups. In this example, the shell and the linear chains on the shell are formed simultaneously from the hydroxyethyl(meth)acrylate.

The foregoing procedure was repeated except that the polymeric cores of Examples 2-8 were substituted respectively, for the polymeric core of Example 1. Similar results were obtained in each case.

EXAMPLE 10

Preparation of Core/Shell Polymers with Epoxy Functional Groups

As described in Example 9, 100 grams of polymers prepared in Examples 1-8 first were mixed with 10.00 gram of glycidyl(meth)acrylate which had been kept at room temperature for one hour to adsorb the monomer onto the macromolecular colloid particles. Then the polymers were polymerized as described in Example 9 to form the shell polymer having linear chains on its surface. These hydrophilic core-hydrophilic shell polymers have epoxy groups at their surfaces for reaction with groups such as amine, carboxyl, hydroxyl, or isocyanate.

EXAMPLE 11

Preparation of Core/Shell Polymers with Aliphatic Groups

As described in Example 9, 100 grams of polymers prepared in Examples 1-8 first were mixed with 10.00 gram of 2-ethylhexyl(meth)acrylate which had been kept at room temperature for one hour to hour to adsorb the monomer onto the macromolecular colloid particles. Then the polymers were polymerized as described in Example 9. These hydrophilic core/hydrophobic shell polymers have hydrophilic aliphatic groups at their surfaces for better film formation and adhesion properties.

EXAMPLE 12

Preparation of Core/Shell Polymers with Carboxylic Groups

As described in Example 9, 100 g of each of the polymers prepared in Examples 1-8 first were mixed with 10.00 gram of (meth)acrylic acid which had been kept at room temperature for one hour to adsorb the monomer onto the macromolecular colloid particles. Then the shell was formed by polymerization as described in Example 9. These hydrophilic core/hydrophic shell polymers have hydrophilic carboxylic groups at their surfaces for reaction with groups such as hydroxyl, epoxy, isocyanate and amine.

EXAMPLE 13

Preparation of Core/Shell Polymers with Carboxylic Groups in the Core

As described in Example 1, a polymer sample was prepared using 10.00 g of (meth)acrylic acid. The reaction was continued according to the procedure described in Example 9 after adding 10.00 g of butylacrylate to obtain a hydrophobic shell. This method is suitable to prepare core/shell polymers with an encapsulated reactive carboxyl group in the core that is available to react with groups such as hydroxyl, epoxy, isocyanate and amine, before being protected with the hydrophobic shell.

EXAMPLE 14

Reaction of Hydroxyl Functionalized Polymers with Isocyanate 100 g of a 75% w/w solution in toluene of the hydroxyl functionalized polymer prepared in Example 9 was mixed with 20 g of a liquid isocyanate prepolymer. The film formed on an aluminum substrate was allowed to dry for two hours, then treated at 100.degree. C. for one hour. The solidified film was crosslinked.

EXAMPLE 15

Reaction of Epoxy Functionalized Polymers with Amine Derivative 100 g of a 75% w/w solution in toluene of the epoxy functionalized polymer prepared in Example 10 was mixed with 25 g of diamino polyethylene glycol derivative. The film formed on an aluminum substrate was allowed to dry for two hours, then treated at 80.degree. C. for one hour. The solidified film was crosslinked.

Those skilled in the art will recognize, or be able to ascertain using no more than routine experimentation, many equivalents to the specific embodiments described specifically herein. Such equivalents are intended to be encompassed in the scope of the following claims.

What is claimed is:

1. A method of forming a crosslinked hydrophobic core co-polymer consisting essentially of reacting butyl acrylate with ethylene glycol di(meth)acrylate through free radical polymerization in a solvent in the presence of an initiator to form an unsaturated hydrophobic core co-polymer having unreacted pendant double bonds, said solvent comprising toluene and said initiator comprising azo bis isobutyronitrile, and post-polymerizing the unsaturated hydrophobic core co-polymer in toluene to form said crosslinked core.

2. The method according to claim 1 wherein the degree of crosslinking is in the range of from about 5% to about 95%.

3. The method according to claim 1 wherein the degree of crosslinking is in the range of from about 20% to about 70%.

4. The method according to claim 1 wherein the degree of crosslinking is in the range of from about 30% to about 50%.

5. The method according to claim 1 wherein said crosslinked hydrophobic core co-polymer is reacted with hydroxyethyl (meth)acrylate in toluene.

6. The method according to claim 5 wherein said crosslinked core co-polymer is further polymerized in toluene to form a shell having at its surface hydroxyl groups.

7. The method according to claim 6 wherein said hydroxyl groups are reacted with isocyanate groups.

8. The method according to claim 1 wherein said crosslinked hydrophobic core co-polymer is reacted with glycidyl (meth)acrylate in toluene.

9. The method according to claim 8 wherein said core co-polymer is further polymerized in toluene to form a shell having at its surface epoxy groups.

10. The method according to claim 9 wherein said epoxy groups are reacted with amine groups.

11. The method according to claim 9 wherein said epoxy groups are reacted with carboxyl groups.

12. The method according to claim 9 wherein said epoxy groups are reacted with hydroxyl groups.

13. The method according to claim 9 wherein said epoxy groups are reacted with isocyanate groups.

14. The method according to claim 1 wherein said crosslinked hydrophobic core co-polymer is reacted with 2-ehtylhexyl (meth)acrylate in toluene.

15. The method according to claim 14 wherein said crosslinked core co-polymer is further polymerized in toluene to form a shell having at its surface hydrophilic aliphatic groups.

16. The method according to claim 1 wherein said crosslinked hydrophobic core co-polymer is reacted with (meth)acrylic acid in toluene.

17. The method according to claim 16 wherein said crosslinked core co-polymer is further polymerized in toluene to form a shell having at its surface carboxylic groups.

18. The method according to claim 17 wherein said carboxylic groups are reacted with hydroxyl groups.

19. The method according to claim 17 wherein said carboxylic groups are reacted with epoxy groups.

20. The method according to claim 17 wherein said carboxylic groups are reacted with isocyanate groups.

21. The method according to claim 17 wherein said carboxylic groups are reacted with amine groups.

22. The method according to claim 1 wherein said free radical polymerization is performed at a temperature of 60° C.

23. The method according to claim 1 wherein said reaction and said post-polymerization are performed in a nitrogen atmosphere.

* * * * *